United States Patent [19]

Lawrence

[11] Patent Number: 4,896,899
[45] Date of Patent: Jan. 30, 1990

[54] GO-CART VEHICLE

[75] Inventor: Don R. Lawrence, Tempe, Ariz.

[73] Assignee: Action Products, Inc., Tempe, Ariz.

[21] Appl. No.: 174,699

[22] Filed: Mar. 29, 1988

[51] Int. Cl.$^4$ ............................................. B62D 1/18
[52] U.S. Cl. ........................... 280/775; 152/409; 180/350; 188/77 R; 280/661; 301/63 PW
[58] Field of Search .................. 280/661, 775; 180/72; 74/391, 665 GE; 188/77 W, 77 R; 301/63 PW, 63 D, 63 DD, 95, 35 R; 152/DIG. 10, 396, 402, 403, 405, 409

[56] References Cited

U.S. PATENT DOCUMENTS

| D. 53,541 | 7/1919 | Vanatta | D12/159 |
|---|---|---|---|
| D. 53,543 | 7/1919 | Wist | D12/205 |
| D. 122,793 | 10/1940 | Forbes | D12/175 |
| D. 171,163 | 12/1953 | McCreary | D14/30 |
| D. 189,746 | 2/1961 | Kurtis | D14/3 |
| D. 190,114 | 4/1961 | Baxter et al. | D14/3 |
| D. 190,640 | 6/1961 | Hibbard | D14/30 |
| D. 190,641 | 6/1961 | Hibbard | D14/30 |
| D. 190,642 | 6/1961 | Hibbard | D14/30 |
| D. 191,508 | 10/1961 | McCaw | D14/3 |
| D. 193,706 | 10/1962 | Davies | D14/3 |
| D. 200,402 | 2/1965 | LeRose | D14/30 |
| D. 226,575 | 3/1973 | Ferdandez et al. | D40/1 A |
| D. 230,962 | 3/1974 | Detzen | D12/88 |
| D. 262,201 | 12/1981 | Bowman | D12/86 |
| 358,687 | 3/1887 | Morrison | 301/122 |
| 738,997 | 9/1903 | Haynes et al. | 280/95 R |
| 1,001,697 | 8/1911 | Sharp | 301/126 |
| 1,586,959 | 6/1926 | Blake | 269/165 |
| 1,618,813 | 2/1927 | Charter | 301/63 R |
| 1,651,715 | 12/1927 | Klee | 301/63 DD |
| 2,154,569 | 4/1939 | Hicks | 280/96.2 |
| 2,162,902 | 6/1939 | Adams | 29/148 |
| 2,693,393 | 11/1954 | Heth | 301/1 |
| 3,511,518 | 5/1970 | Freber | 301/63 D |
| 3,533,302 | 10/1970 | Hansen | 74/493 |
| 3,554,535 | 1/1971 | Gerry | 301/63 DD |
| 3,718,053 | 2/1973 | Cinadr | 74/493 |
| 3,790,220 | 2/1974 | Manss | 301/63 D |
| 3,828,895 | 8/1974 | Boaz | 188/77 R |
| 3,870,371 | 3/1975 | Solomon | 301/1 |
| 4,008,923 | 2/1977 | Walther et al. | 310/63 D |
| 4,243,339 | 1/1981 | Dickerson | 280/661 |
| 4,487,294 | 12/1984 | Geeck, III | 188/77 R |
| 4,495,834 | 1/1985 | Bauer et al. | 74/493 |
| 4,606,429 | 8/1986 | Kurata | 180/72 |
| 4,629,023 | 12/1986 | Carpanelli et al. | 180/72 |

OTHER PUBLICATIONS

TPS Productivity Workbook (second edition) Series 872, GE Plastics.

Primary Examiner—Kenneth R. Rice
Assistant Examiner—Eric Culbreth
Attorney, Agent, or Firm—Charles E. Cates

[57] ABSTRACT

A go-cart vehicle, made from high strength, molded engineering plastics, has a steering shaft tilt assembly which includes a steering shaft (66) slidable in a pivot bushing (70) carried by a bracket (73). The shaft pivots at a U-joint (78) and the bracket (73) pivots at its base. The bracket carries a detent—a cylinder (94) attached to the base (74) of the bracket (73). The cylinder (94) has a number of holes (93) to engage a latch pin (92) which is controlled by a release lever (95) operated by a release button (102). The shaft (66) may be adjusted to varying angles of tilt by moving the latch pin from hole to hole which motion causes the bushing, shaft and bracket to pivot in unison as the shaft slides in the bushing. The vehicle combines a change in caster angle (12) to about 12 degrees with a short, rigid chassis (2) and a live axle (45) to make it possible to turn a sharp corner at speeds of 20 mph or less. The engine (4) is positioned at the lateral midpoint of the vehicle and a crankshaft extension (21) is employed. The power train includes a drive ring (34) that directly engages the wheel spokes (38) by means of an integrally molded, toroidal boss (36) provided with grooves (37) mating with the spokes (38) to drive the same. A one-piece unitary wheel (111) wherein the tire (112) is fitted on a flat rim (115) of the wheel (111) molded of plastic, which rim (115) is then completed with an ultrasonically welded flange (116) to make the wheel (111), including the tire, a unit that cannot be separated.

17 Claims, 4 Drawing Sheets

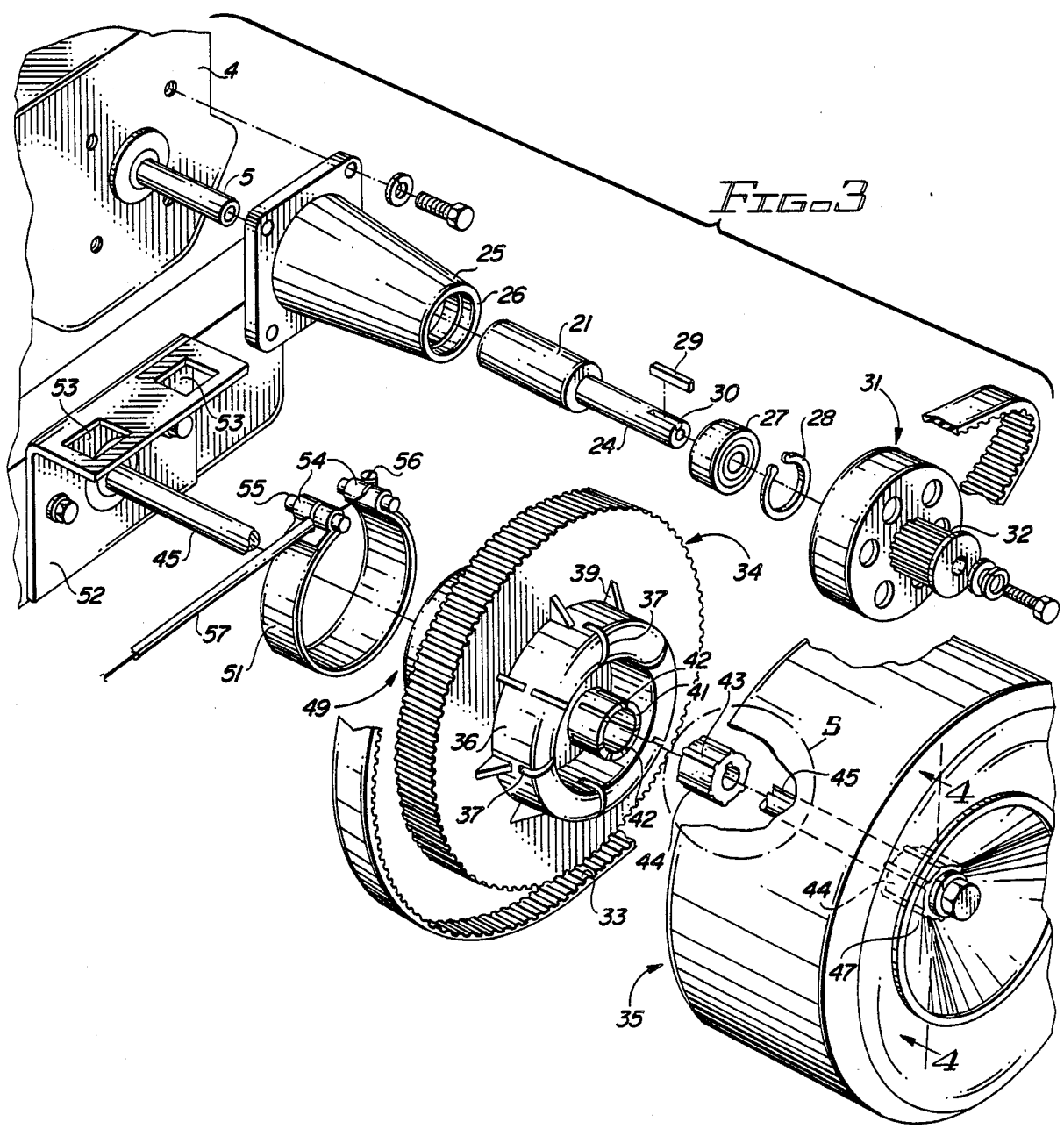

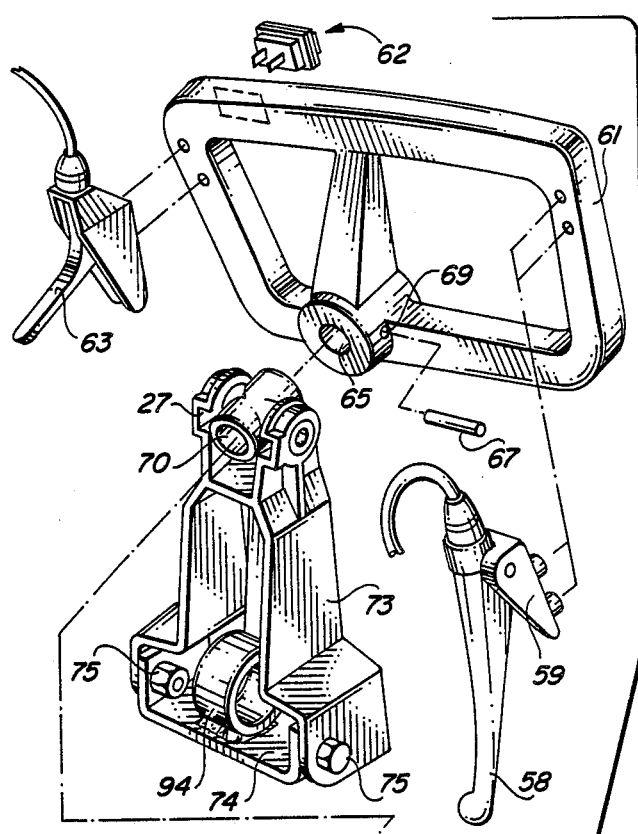
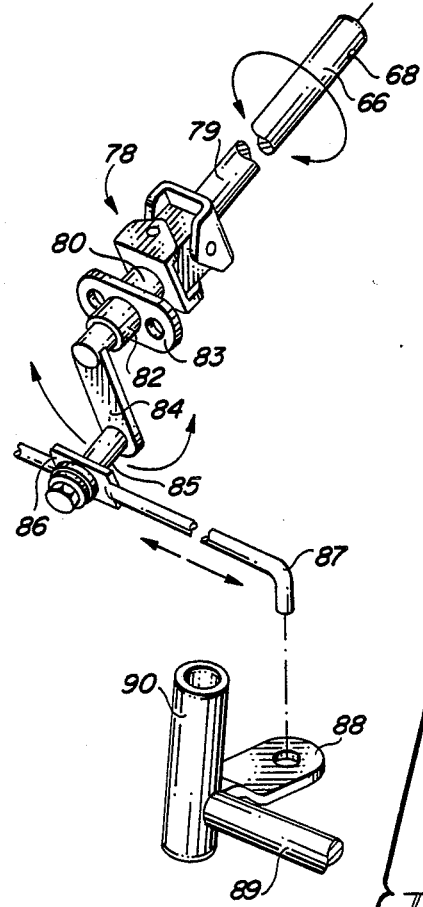
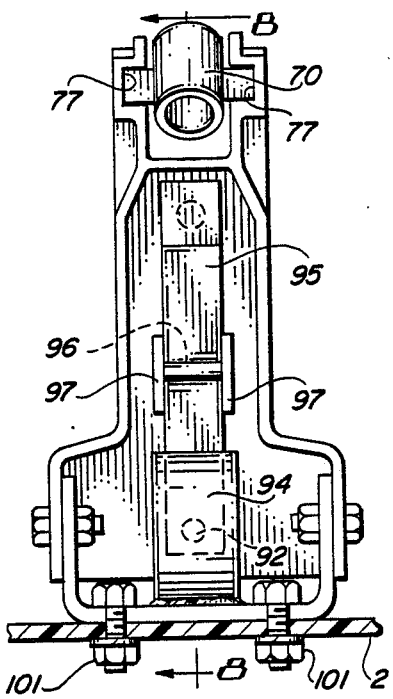
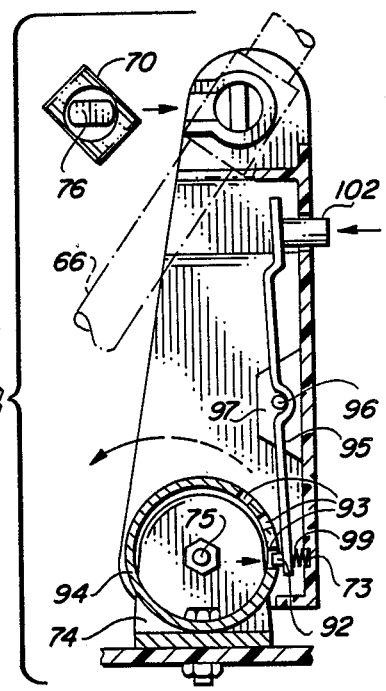
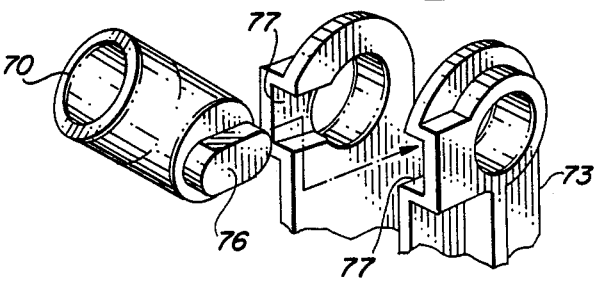

GO-CART VEHICLE

BACKGROUND OF THE INVENTION

The invention relates to go-cart type vehicles useful for recreation, public entertainment, and in promotions of full size vehicles wherein a body style selected by the buyer is mounted on the cart. Such vehicles are normally driven on private roadways where ordinary vehicle traffic is not encountered, on parade routes, in private enclosures and, in some forms of the vehicle, on race tracks, usually dirt, which are specially constructed for and dedicated to go-cart racing.

There is a substantial demand for go-cart racing style vehicles even in the more subdued utility of the showroom, the parade ground and the private track. The racing image is preferred by many go-cart purchasers, both adult and juvenile. This vehicle image includes a live axle, two wheel rear drive which is inexpensive to provide but which poses a problem in the setting in which the non-racing go-carts are used. A live axle has no differential. The two back wheels, which are both driving wheels, tend to drive the vehicles straight ahead even though the front wheels are sharply turned, especially at low turning speeds in this environment of 20 m.p.h. and less. The result is that the cart scuffs the front wheels and resists turning in other than an extremely wide arc which is unacceptable in restricted interior spaces, private roadways and parade routes. Racing go-carts, by contrast, are longer wheel base (e.g., 42 to 45 inches), flexible, and are ordinarily raced on a dirt track or equivalent, and the absence of a differential gear is overcome by executing a controlled skid at speeds of 30-40 m.p.h. around the curves in the track. This action is the very thing that, among others, creates the desirable image of the racing go-cart but which is impossible to duplicate in the more ordinary uses described above. There is ample incentive to provide the live axle racing style of go-cart if this problem can be overcome because the desired image may be provided while saving the considerable cost of installing differential gear means.

Accordingly, there is a need for a go-cart type vehicle with a live axle that will turn sharp corners.

A second problem associated with go-carts made for the recreational, promotional and exhibition markets is that the purchasers and users are for the most part adults of varying sizes and builds. Go-carts are very small vehicles whose wheel bases are, customarily, on the order of 42 to 45 inches. This particular problem has been addressed on many occasions by providing tilt up steering wheels that can be adjusted to better fit the size of the driver. Although a number of solutions have been proposed, a need exists for an improvement in the tilt wheel steering wheel apparatus of a go-cart.

A third problem encountered in the prior art is the complexity and expense of the wheels for go-carts. Prior art wheels are the hub and associated rim which is either two halves bolted together after the tire, usually pneumatic, is installed, or a hub having a drop center rim similar to the rims of full size vehicles which permits the removal of the tire with a tire iron. There are problems associated with the bolt type. Vibration tends to loosen the bolts and the parts tend to creep out of alignment. The drop center type, on the other hand, is expensive to manufacture. A need exists for a more dependable, less expensive wheel structure for go-cart use.

SUMMARY OF THE INVENTION

To achieve the foregoing objects and other objects which will appear as the description unfolds, I have provided in a driver operated motor vehicle of the go-cart type a short, rigid chassis which carries a pair of steerable front wheels that support the front portion of the chassis by means of a rigid suspension that has a king pin with a caster angle of about 10 to 15 degrees to the rear, preferably about 12 degrees. A pair of rear drive wheels carried on a live axle support the rear portion of the chassis. This puts extra load on the two front wheels and serves to lift the rear drive wheel on the inside of the turn enough to permit it to slip. The release of the tire permits the go-cart to make a sharp turn without scuffing or sliding the tires. In a preferred embodiment the wheel base of the chassis is 36 inches.

The front wheels are operated by a steering wheel and appropriate steering linkage according to an improved apparatus for tilt wheel adjustment of the steering shaft and wheel, all as more particularly described in later paragraphs.

An engine is mounted on a rear portion of the chassis and has an output shaft which is preferably disposed transversely of the chassis; and a transmission transfers the output of the engine to the drive wheels. A driver operable gas feed is provided for regulating the speed of the engine. Also, a seat arrangement is provided to support a driver.

In a preferred embodiment of my go-cart improvement I provide an adjustable-tilt steering wheel assembly which has the following elements, among others: a steering wheel; a steering shaft connecting the steering wheel to a tie rod; a universal joint connecting two lengths of a steering shaft, and providing a pivot point for the steering shaft. An upstanding bracket, pivotally attached at its lower end to the top surface of the chassis, has a bushing pivotally disposed in the bracket's upper end for partial rotation about a horizontal axis transverse the chassis. The bracket has an aperture sized to slidably receive the steering shaft. Also provided are detent means carried on or near the bracket which are releasably engageable with a catch means attached to the chassis. Thus, the bracket may be pivoted to a selected one of the catch means positions to raise or lower the degree of tilt of the steering shaft to suit the convenience of the driver;

Preferably the chassis is molded from one of a group of Technopolymer (brand) engineering plastics including Azdel (polypropylene resin), Azmet (polyester resin) and Azloy, preferably Azdel brand of fibre glass filled polypropylene resin, a plastic material available from Azdel, Inc., Plastics Technology Center, General Electric Company, Plastics Group, One Plastics Avenue, Pittsfield, Mass. 01201. Also, in the preferred embodiment, the wheels have a tire and a hub assembly with a substantially flat rim surface and at least one ultrasonically welded flange (of two flanges carried on the rim surface for engaging the bead of the tire);

The vehicle has a belt drive connecting the output shaft of the engine to the drive wheel and a self energizing brake means operatively connected to the drive wheel.

Another useful feature of the vehicle which answers the need for a simply constructed, fool proof assembly incorporating in a single unitary element, is a molded plastic wheel drive ring adapted for direct drive of a wheel. The wheel drive means has, integrally formed on a first side, a toroidal boss having apertures for engaging the spokes of a wheel to directly drive the wheel. A brake drum integral with the second side, a brake band operatively connecting a brake band operator and the brake drum, and a transmission adapted to transfer the output of the engine to the wheel drive ring.

It is highly desirable to locate the engine near the lateral center of the go-cart to balance the weight. To achieve this end the engine output shaft is provided with a shaft extension which preferably is a hollow, cone-shaped support whose base is mounted on the chassis with the cone coaxially surrounding and supporting the output shaft of the engine. A drive sprocket is mounted on the extension and a belt connects the drive sprocket to the wheel drive ring.

BRIEF DESCRIPTION OF THE DRAWINGS

Turning now to the drawings in which a presently preferred embodiment of the invention depicted:

FIG. 3 is an exploded view of the power train and braking assembly of FIG. 2, but shown in greater detail;

FIG. 4 is a cross section of a partial view of the wheel of FIG. 3, taken along the lines 4—4;

FIG. 5 is an enlarged view of the bushing designated in the broken line circle in FIG. 3 as 5;

FIG. 6 is an exploded view of the tilt wheel steering assembly, greatly enlarged, of FIG. 1;

FIG. 7 is a an elevation view of the steering shaft support bracket shown in perspective in FIG. 6;

FIG. 8 is a side elevation of the bracket of FIG. 7, partly exploded and taken in section along the lines 8—8;

FIG. 9 is a perspective view of the upper section of the bracket of FIG. 8;

DESCRIPTION OF THE PREFERRED EMBODIMENT

Figure 10:
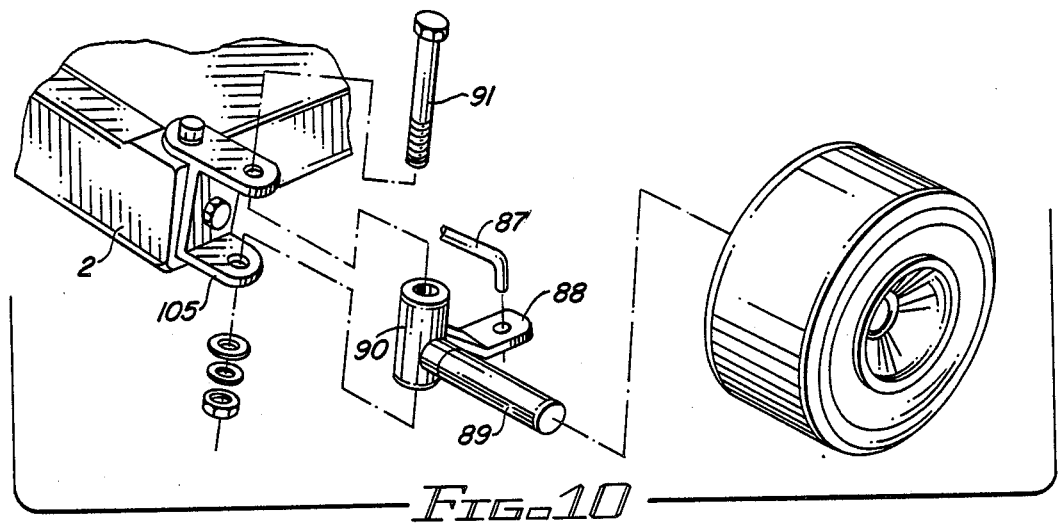
FIG. 10 is an exploded view of the wheel suspension elements of the vehicle of FIG. 1.
Figure 11:
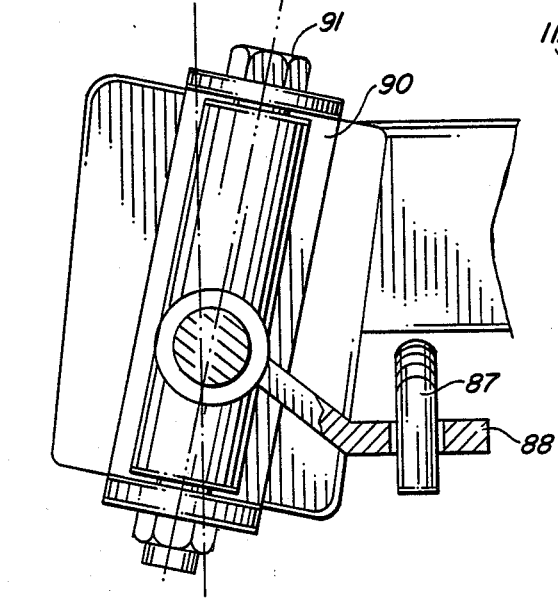
FIG. 11 is an enlarged view of the king pin assembly showing the caster angle.
Figure 12:
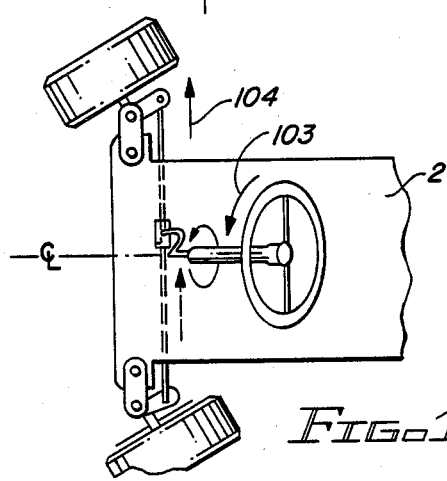
FIG. 12 is a schematic representation of the front end suspension of the vehicle shown in the turning position.
Figure 13:
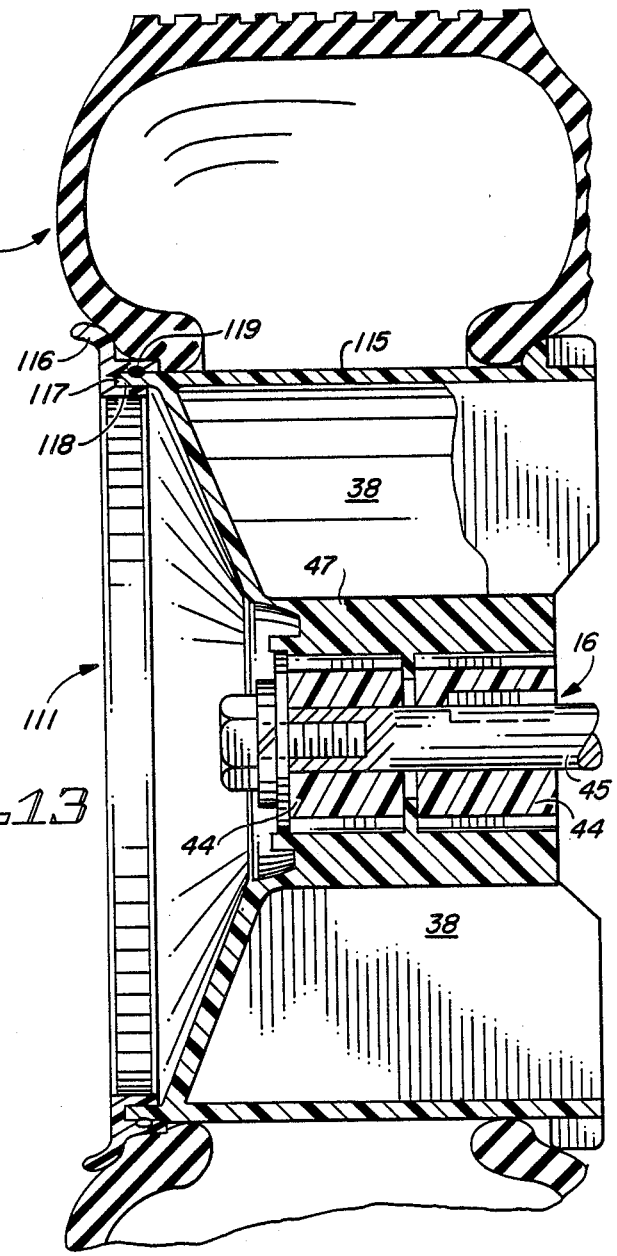
FIG. 13 is a section view showing the unitary wheel construction of the vehicle.

Referring initially to the perspective view of FIG. 1, the chassis, indicated generally as 2, carries the following sub-assemblies which will be discussed in greater detail as the description of the preferred embodiment progresses:

1. the drive train shown in FIGS. 2-5;
2. the tilt wheel steering shaft assembly shown in FIGS. 6-9;
3. the suspension system shown in FIGS. 10-12;
4. the unitary plastic molded wheel unit shown in FIG. 13;

Additionally the chassis 2 preferably having a wheel base of 36 inches carries an engine 4 positioned in the lateral center of the vehicle, as will be explained more at length, and a driver's seat 6.

Figure 2:
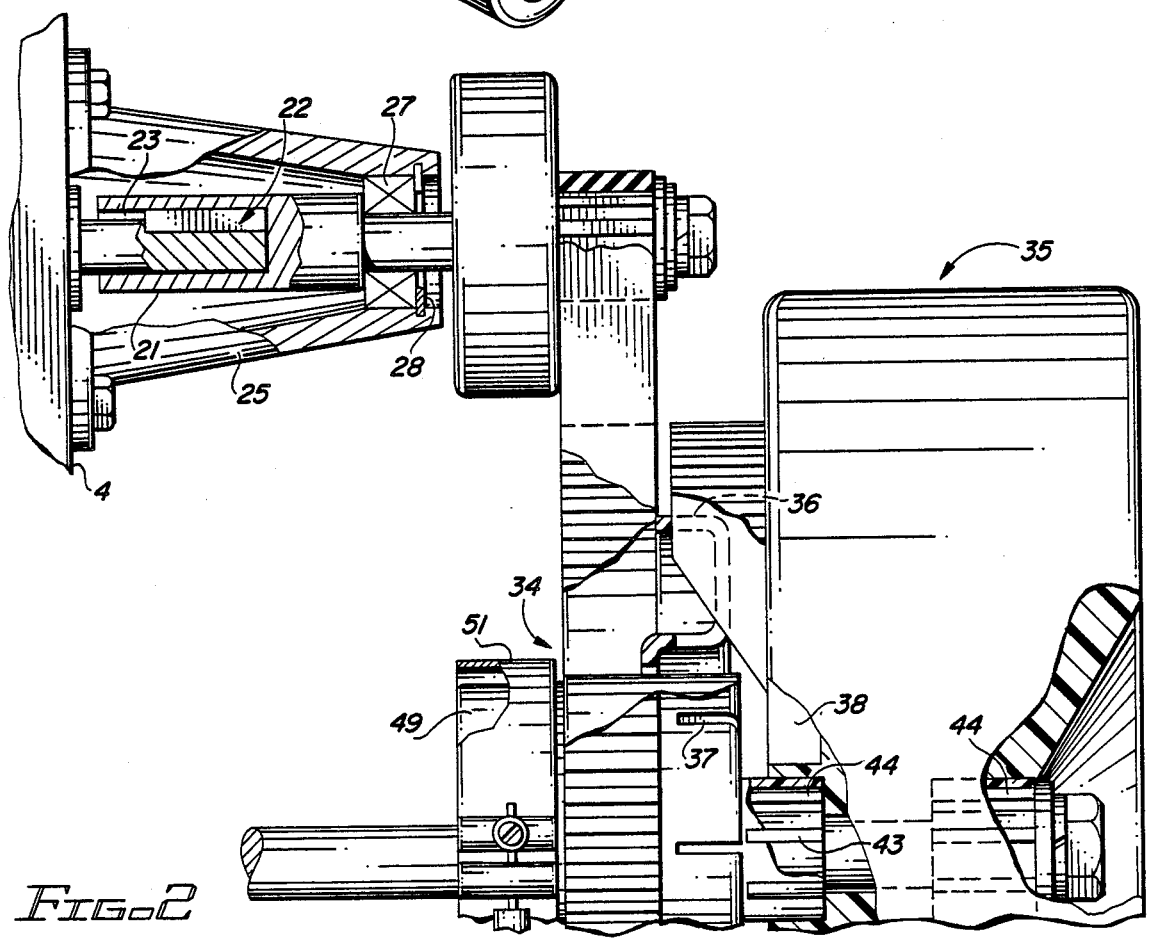
FIG. 2 is an enlarged view of the power train, partially broken away to show the inner workings, from the drive shaft to the drive wheel of the vehicle of FIG. 1.

Proceeding now with the description of the presently preferred embodiment of the invention, attention is directed to the power train 20 which is isolated in FIG. 2 and is best understood from the exploded view of FIG. 3. The engine 4 has an output shaft 5 which is extended by means of extension shaft 21 which is provided with a cylindrical end having a bore 23 that coaxially receives the shaft 5 and engages the shaft 5 by means of a slot and key 22. The other end 24 of shaft 21 is reduced to the same diameter as the output shaft 5. It is held in axial position by the cone 25 whose truncated smaller end 26 is sized to receive a ball bearing 27 which is held by a snap ring 28. The smaller end 24 of the extension shaft 21 has a slot and key means 29, 30 to engage the centrifugal clutch and sprocket assembly 31 which is of standard manufacture and may be selected and mounted as is known in the art. The sprocket 32, belt 33 and wheel drive ring 34 have mating grooves and lands made under a license of Gates Rubber Co. HTD brand belt drive, U.S. Pat. No. 4,233,852.

The output of the engine 4 is transferred to the drive ring 34 by the apparatus described and as shown in FIGS. 2-3. The drive ring 34 is constructed to directly engage and drive the wheel 35. This is accomplished by providing a toroidal boss 36 integrally molded in the drive ring 34, which boss 36 has grooves 37 sized to engage the spokes 38 of wheel 35. The boss 36 has fillets 39 as additional support. Integrally molded on the drive ring 34 is a guide cylinder 41 with slots 42 sized to engage spokes 38.

A bushing 44 has an axial aperture that fits the diameter of axle 45 to which it is rotatably secured by a key and slot means 46. A second bushing 44 is disposed on the axle 45 on the outside of the wheel hub 47. The bushing may be replaced by a ball bearing race if desired to make the wheel free-wheeling. This could be done on all four wheels, if, for example, a single wheel drive were preferred. The function of the bushing 44 in the other rear wheel 48 is make both wheels 35,48 drive wheels.

Also, molded integral in the drive ring 34 is a cylindrical brake drum 49. A brake band 51 retained in place for operation on the drum by means of a brake support plate 52 which has openings 53 shaped to receive the ends 54 of the brake band 51. These ends are formed to receive pins 55 which are inserted to secure the ends 54 after they are positioned in the plate 52. A cable 57 is passed through holes in the pins 55 and the ends 54 and tightened by screw 56. The remote end of the cable is attached to the brake lever 58 by any convenient known means. The lever 58 is pivotally supported on a pin in a mount 59 attached to the steering wheel 61.

Attention is invited to the steering assembly illustrated in detail in FIGS. 6-9. The steering wheel 61 is a molded one-piece plastic structure which, as previously described, has provision for mounting the brake lever 58. It also has provision for mounting an on/off switch 62 (a standard item which can be obtained from Arrow-Hart and other sources). It is connected to the engine 4 by suitable electrical circuitry (not shown). A throttle 63 is mounted on the steering wheel and operatively connected to the engine 4 by means of cable 64. Inasmuch as the on/off switch and throttle are devices well known to persons ordinarily skilled in the art, the details of the connections to the engine need not be shown for a full and complete understanding of the details of the invention.

The steering wheel 61 has a bore 65 sized to snugly receive a steering shaft which is retained in place by pin 67 driven into registering holes 68 and 69 in the shaft 66 and wheel 61. The shaft 66 is rotatably received in pivot bushing 70 which in turn is journaled in the upper end of a bracket 73 which has a support base 74 to which the bracket 73 is attached by means of a pivot arrangement, wherein bolts 75 are the pivot points in registering apertures in the base 74 and bracket 73. The bushing has support arms 76 shaped to slide into slots 77. Once inserted the bushing 70 is turned a number of degrees to the operational position. The insertion should be made as shown in FIG. 8 to assure retention when the shaft 66 is moved up and down. The shaft 66 has upper 79 and lower 80 segments articulated by U-joint assembly 78. The lower segment is rotatable in sleeve 82 in mounting plate 83 (attached to chassis by bolts) and terminates by attachment to displacement arm 84 and tie rod mover 85 which in turn is journaled in tie rod pivot plate 86 and secured conventionally. The tie rod 87 is in turn attached to plate 86. The tie rod engages the steering arm 88 which includes spindle 89 and king pin sleeve 90. The king pin 91 rotatably attaches the king pin sleeve 90 to the spindle bracket 105 which in turn is bolted to the chassis 2.

Considering in further detail the bracket 73 and base 74, with particular reference to FIG. 8, the steering shaft 66 is maintained at the desired angle of tilt by engaging latch pin 92 in one of holes 93 in cylinder 94. The pin 92 is carried by release lever 95 which is captured by pivot pin 96 journaled in ears 97 and operated by pushing release button 102. Latch pin 92 is urged into hole 93 by spring 99 which bears against bracket 73. Cylinder 94 is axially centered on the axial centers of bolts 75 which provide the pivots for bracket 73 and is fixed in place by welding to the base 74 which in turn is anchored to the chassis by means of bolts 101.

To release and engage different ones of holes 93 one pushes button 102 which causes latch pin 92 to disengage its hole. Then the steering shaft 66 can be tilted to a new position and pin 92 engaged in a new hole 93. During the tilt movement the shaft 66 pivots on its U-joint, bushing 70 slides on the shaft 66 and rotates a few degrees, and bracket 73 pivots on bolts 75.

Figure 1:
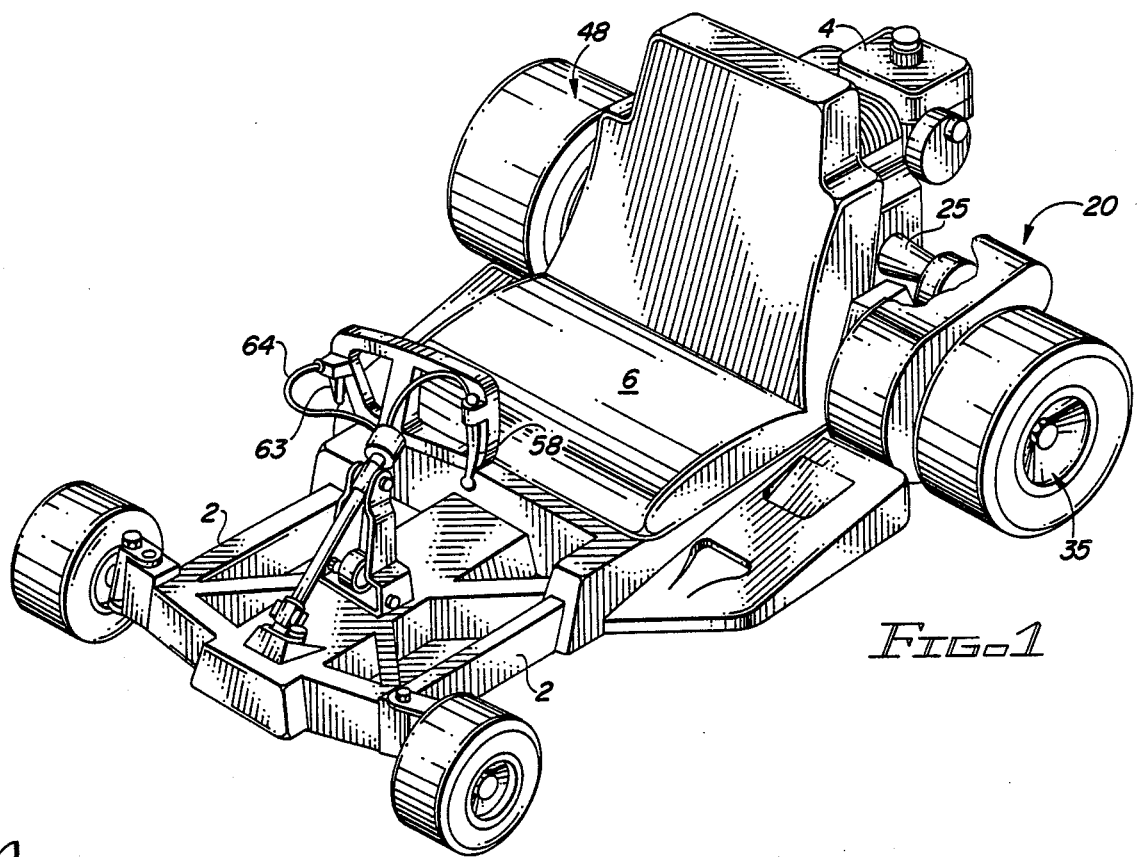
FIG. 1 is a perspective view of the vehicle.

Referring now to FIGS. 1 and 12 specifically, sharp turns on a live axle are possible in this vehicle at speeds of 20 m.p.h. and less due to the combination of a short, rigid (non flexing) chassis 2 and a change of caster angle 72 from the customary 3–5 degrees to about 10 to 14 degrees, preferably about 12 degrees. As shown in FIGS. 10–12, the king pin 91 determines an angle of 12 degrees rearward from vertical. This causes the momentum of travel to load the weight of car and driver to the outside, causing the rear drive wheel on the inside of the turn to lift enough to slip. FIG. 12 illustrates a left turn (arrow 103) directing the load to the outside (arrow 104).

The wheel assembly is unitary in that the wheel 111 is a two-piece plastic wheel made one-piece with the pneumatic tire 112 already in place. This is accomplished by casting all of the wheel 111 including hub 47, spokes 38, and rim 115, placing the tire 112 in place on the rim surface, and ultrasonically welding flange 116 to the rim 115. Flange 116 in cross section has a continuous groove 117 into which the edge 118 of the rim 115 closely fits. A small bead which prevents a complete fit is ultrasonically vibrated to complete a weld 119 between the flange and the edge 118.

While the preferred embodiment is the subject of the detailed description it is to be understood that equivalent structures and modifications will occur to those ordinarily skilled in the art and such equivalents are intended to be embraced in the scope of the claims appended hereto.

What is claimed is:

1. A driver operated motor vehicle of the go-cart type comprising:
   a. a chassis having a top surface and front, rear and mid portions;
   b. a pair of steerable front wheels and a pair of back wheels comprising at least one drive wheel and supporting said chassis;
   c. a tilt wheel steering assembly comprising:
      (1) a tie rod operatively connected to said front wheels;
      (2) a steering wheel;
      (3) a steering shaft connecting said steering wheel and said tie rod;
      (4) Universal joint means articulating said steering shaft in two segments near the bottom thereof;
      (5) a bracket pivotally mounted on the surface of said chassis and comprising:
         (a) a bushing pivotally disposed in the upper end of said bracket for partial rotation about a horizontal axis transverse said chassis and having an aperture sized to slidably receive said steering shaft; and
         (b) catch means having a plurality of catch positions and attached to said chassis;
         (c) detent means carried by said bracket;
         whereby said bracket may be rotated to a selected position of said catch means to adjust the degree of tilt of said steering shaft to suit the convenience of the driver;
   d. said wheels comprising a tire and a hub assembly comprising a substantially flat rim surface and at least one flange ultrasonically welded to said rim surface for engaging a bead of said tire;
   e. an engine mounted on a rear portion of said chassis;
   f. transmission means adapted to transfer the output of said engine to said said drive wheels;
   g. driver operable means for regulating the speed of said engine; and
   h. seat means for supporting a driver of said vehicle.

2. The vehicle of claim 1 wherein said chassis has a wheel base of about 36 inches.

3. The vehicle of claim 1 wherein said chassis is a molded engineering plastic material.

4. The vehicle of claim 1 wherein said engine is transverse said chassis, is centered laterally on said rear portion, and has an extension of said output shaft.

5. The vehicle of claim 1 wherein said chassis is molded from an engineering plastic material.

6. A driver operated motor vehicle of the go-cart type comprising:
   a. a chassis having front, rear and mid portions;
   b. a pair of steerable front wheels and a pair of back wheels comprising at least one drive wheel and supporting said chassis;
   c. driver operable steering means operatively attached to said steerable front wheels;
   d. said wheels comprising a tire and a hub assembly comprising a substantially flat rim surface and at least one flange ultrasonically welded to said rim surface for engaging a bead of said tire;
   e. an engine mounted on a rear portion of said chassis;

f. transmission means adapted to transfer the output of said engine to said drive wheels;

g. driver operable means for regulating the speed of said engine;

h. seat means for supporting a driver of said vehicle;

i. a one-piece, molded plastic wheel drive ring adapted for direct drive of said drive wheel comprising:
   (1) a perimeter;
   (2) a first side;
   (3) a second side;
   (4) wheel drive means integral with said first side comprising a toroidal boss having apertures therein for engaging spokes of said wheel;
   (5) a brake drum integral with said second side;
   (6) a brake band operatively connected to a brake band operator and to said brake drum;

j. transmission means adapted to transfer the output of said engine to said drive sprocket;

k. an engine mounted on a rear portion of said chassis;

l. driver operable means for regulating the speed of said engine; and m. seat means for supporting a driver of said vehicle.

7. The vehicle of claim 6 wherein said chassis has a wheel base of about 36 inches.

8. The vehicle of claim 7 wherein said chassis is molded from an engineering plastic material.

9. The vehicle of claim 8 wherein said chassis comprises fiberglass filled polypropylene.

10. The vehicle of claim 6 wherein said engine is transverse said chassis, is centered laterally on said rear portion, and has an extension of said output shaft.

11. The vehicle of claim 6 wherein:
   a. said transmission means comprises:
      (1) shaft extension means for extending the length of the output shaft of the engine;
      (2) a drive sprocket mounted on said extension;
      (3) a belt connecting said drive sprocket to said wheel drive ring;
      (4) support means having a base mounted on said engine and a cone extending therefrom and coaxially enclosing and supporting said shaft extension means; and
   a. the engine is mounted near the lateral center of the vehicle.

12. A driver operated motor vehicle of the go-cart type comprising:
   a. a chassis having front, rear and mid portions;
   b. a pair of steerable front wheels supporting said front portion of said chassis by rigid suspension means comprising a king pin having a caster angle of about 10 to 15 degrees; and a pair of rear drive wheels carried on a live axle and supporting said rear portion of said chassis;
   c. driver operable steering means operatively attached to said steerable front wheels comprising a tilt wheel steering assembly comprising:
      (1) a tie rod operatively connected to said front wheels;
      (2) a steering wheel;
      (3) a steering shaft connecting said steering wheel and said tie rod;
      (4) universal joint means articulating said steering shaft in two segments near the bottom thereof;
      (5) a bracket pivotally mounted on the surface of said chassis and comprising:
         (a) a bushing pivotally disposed in the upper end of said bracket for partial rotation about a horizontal axis transverse said chassis and having an aperture sized to slidably receive said steering shaft; and
         (b) detent means carried by said bracket and releasably engageable with a catch means attached to said chassis;
   d. said wheels comprising a tire and a hub assembly comprising a substantially flat rim surface and at least one ultrasonically welded flange of two flanges carried on said rim surface for engaging a bead of said tire;
   e. an engine mounted on a rear portion of said chassis;
   f. transmission means adapted to transfer the output of said engine to said drive wheels;
   g. driver operable means for regulating the speed of said engine;
   h. seat means for supporting a driver of said vehicle.

13. The vehicle of claim 12 wherein said caster angle is about 12 degrees.

14. The vehicle of claim 12 comprising a chassis with a wheel base of about 36 inches.

15. The vehicle of claim 12 wherein said chassis is a molded engineering plastic material.

16. The vehicle of claim 15 wherein said chassis comprises fiberglass filled polypropylene.

17. The vehicle of claim 12 wherein said engine is transverse said chassis, is centered laterally on said rear portion, and has an extension of said output shaft.

* * * * *

UNITED STATES PATENT AND TRADEMARK OFFICE
CERTIFICATE OF CORRECTION

PATENT NO. : 4,896,899
DATED : January 30, 1990
INVENTOR(S) : Don R. Lawrence

It is certified that error appears in the above-identified patent and that said Letters Patent is hereby corrected as shown below:

In Claim 11, column 7, line 45, "a." has been changed to --b.--.

Signed and Sealed this

Eighth Day of January, 1991

Attest:

HARRY F. MANBECK, JR.

*Attesting Officer*  *Commissioner of Patents and Trademarks*